Aug. 18, 1953          C. W. BERRY                2,648,927
                     FISH AND CRAB HOOK
                     Filed July 7, 1952
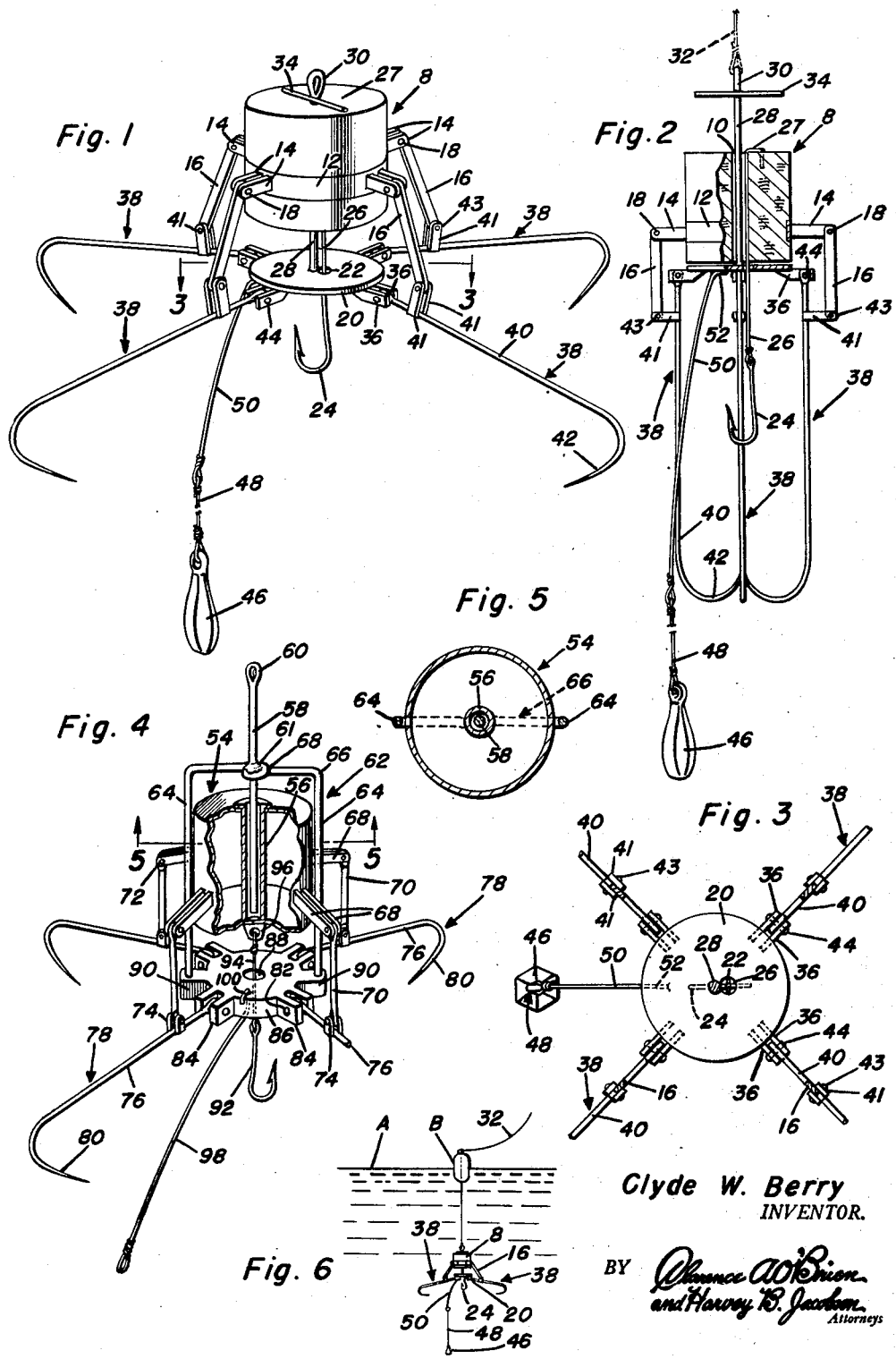
Clyde W. Berry
INVENTOR.

Patented Aug. 18, 1953

2,648,927

UNITED STATES PATENT OFFICE 2,648,927

FISH AND CRAB HOOK

Clyde W. Berry, Naval Base, S. C.

Application July 7, 1952, Serial No. 297,551

8 Claims. (Cl. 43—37)

1

The present invention relates to certain new and useful improvements in a novelly constructed and performing multiple hook structure or device which, because of its unique construction and adaptability, is aptly suited for reliable use in catching crabs, fishes and the like.

In carrying out the desired principles of the invention a float is employed and this suspends an axially aligned spider. The float is provided with a flexibly attached centrally disposed bait hook and the spider is provided with a plurality of circumferentially spaced equidistant grappling hooks. The latter are pivotally attached at their respective inner ends to the marginal portions of the spider and they have their intermediate shank portions operatively linked to the float.

An obvious object of the invention is to structurally, functionally and otherwise improve upon similarly constructed and performing fishing and crabbing devices and, with a view toward achieving this end, rigid push-pull links are utilized and these are pivotally connected at their upper ends with ears carried by the float and are pivotally connected at their lower ends with similar ears carried by the intermediate shank portions of the grappling hooks.

Another object of the invention has to do with the manner in which the bait hook is arranged and utilized. To this end the bait hook is provided with a flexible leader which extends upwardly through a central aperture in the spider with the leader suitably anchored axially on said float.

A further object has to do with a sinker which serves to submerge the entire device below the surface of the body of water, said sinker having a flexible attaching leader and said leader being connected to a longitudinally bowed wire member, the latter being flexibly resilient and anchored at its upper end to an off center marginal portion of the spider to in this manner prevent the sinker and its connections from colliding with the bait hook.

In one form of the invention the float takes the form of a cork which has a central or axial passage opening through its opposite ends and a rigid rod is reciprocable in said passage, being secured at its lower end to a central portion of the spider and having its upper end shouldered and cooperating with the upper end of the float and also provided at its upper end with an eye to accommodate a fishing line.

A second form of the invention is preferably provided with a hollow float which is harnessed in place by an inverted U-shaped frame or yoke,

2 the arms of the frame straddling diametrically opposite portions of the float and being secured at their lower ends to cooperating marginal portions of the spider, the bight portion of said frame having an aperture to accommodate a rigid rod member. The rod member slides through the aperture and into a tubular hub or passage in the float, the upper end of the rod having a line attaching eye and the intermediate portion of the rod having a shoulder with the shoulder serving as a stop or check element and the latter being situated between the upper end of the float and said bight portion.

Other objects, features and advantages will become more readily apparent from the following description and the accompanying sheet of drawings.

In the accompanying drawings wherein like numerals are employed to designate like parts throughout the views:

Figure 1 is a perspective view of a fishing and crabbing device constructed in accordance with the principles of the present invention, this being one form or embodiment of the invention.

Figure 2 is a view based on Figure 1 and in elevation and partly in section and showing the grappling hooks contracted or folded in, the position they take when a catch has been made.

Figure 3 is a horizontal section of a fragmentary type taken on the plane of the horizontal line 3—3 of Figure 1, looking in the direction of the arrows.

Figure 4 is a perspective view similar to Figure 1 with portions broken away and shown in section, this disclosing a second form or embodiment of the invention.

Figure 5 is a horizontal section taken on the approximate line 5—5 of Figure 4, looking in the direction of the arrows.

Figure 6 is a diagrammatic view on a small scale showing the manner in which the device is used and is set for making a catch.

By way of introduction to the detailed description and generically presented both forms of the invention have to do, briefly stated, with a float having circumferentially spaced radial outstanding ears, a spider in axial alignment with said float and movable toward and from said float, a plurality of circumferentially spaced grappling hooks having shank portions pivotally connected to the marginal edge portion of said spider, rigid push-pull links pivotally connected at corresponding ends to intermediate portions of the respective shank portions, the opposite ends of said links being pivotally connected with their respective ears on said float, a longitudinally bowed wire member secured at its upper end to an off center peripheral portion of said spider, a sinker having a flexible leader attached to the lower end of said wire member, said spider having a centered hole therein, a bait hook, and a flexible leader attached to the upper end of said bait hook, passing upwardly through said hole, and secured to a central axial portion of said float.

Reference is made first to Figures 1, 2 and 3 wherein the float, which takes the form of a cork or an equivalent body, is cylindrical and is denoted by the numeral 8. The float is provided with a central axial passage 10 which opens through the top and bottom portions as shown in Figure 2. It is provided with an encircling metal or equivalent band 12 which in turn is provided with equidistant circumferentially spaced pairs of outstanding radial ears 14 to which the correspondingly arranged push-pull links 16 are pivotally connected as at 18. The spider is in alignment with the float and is herein the form of a circular plate or disk 20 and it is provided with a hole 22 as shown. The bait hook is denoted at 24 and is provided with a flexible leader 26 which extends upwardly through the hole 22 and upwardly through the passage 10 where it is suitably anchored at 27 to the upper end of the float as shown in Figure 2. The numeral 28 denotes a rigid rod which is secured at its lower end to the central portion of the spider and this extends upwardly through the passage where it is provided on its upper end with an eye 30 to which the fishing line 32 is connected. It is also provided with a cross-piece 34 which is a stop and engages the upper end of the float and limits the downward spacing of the spider when the device is in use in the water as shown in Figure 6. The spider is provided with ears 36 also at equidistant circumferentially spaced points, said ears being joined to the marginal portion of the spider. There are four sets of ears to accommodate the four circumferentially spaced grappling hooks 38. Each grappling hook has a shank portion 40 and a hook portion 42 and the inner ends of the shank portions are arranged between and pivotally attached to the respective ears 36 as at 44. These grappling hooks are openable and closable in relation to the bait hook.

To open and close the grappling hooks 38, the shank portions are provided with spaced ears 41 and the links 16 are pivoted thereto as at 43.

The sinker is denoted by the numeral 46 and has a flexible leader 48 joined to the lower end of a flexibly resilient wire member or finger 50. The latter is longitudinally bowed and has its upper end secured at 52 to the underside of the marginal portion of the spider. This finger locates the sinker and leader off center with respect to the bait hook and thus these parts are prevented from colliding with one another and interfering with the fish taking the bait on the bait hook in an obvious manner.

It is obvious that when the fish takes the bait on the bait hook 24 a pull is exerted on the leader and against the float and, assuming that the grappling hooks are in the floating spread position shown in Figures 1 and 6, it is obvious that when the spider and float come together in the manner shown in Figure 1 as a result of the pull by the fish and fisherman on the fishing line, the links 16 come into play and forcibly drive the grappling hooks into the body of the then captured fish. The sinker serves to submerge the entire device below the surface of the water A in the manner shown in Figure 6 and if desired a float B may be provided on the fishing line 32.

With reference now to the modification shown in Figure 4, it will be seen that the float is cylindrical and hollow and is denoted by the numeral 54. It has a central hub forming tube or passage 56 therein and a rigid line rod is here again provided and this is denoted by the numeral 58 and is provided at its upper end with a line eye 60 to which the line (not shown) is attached. The lower end of the rod 58 telescopes slidably into the passage 56. In this arrangement there is an inverted U-shaped frame or yoke 62 embodying arms 64—64 which straddle the float on diametrically opposite sides. The arms are attached together at their upper ends by a bight portion or cross-piece 66 having a central eye 68 through which the rod 58 passes and is fixed, as at 61. Here again the float is provided with circumferentially spaced pairs of equidistant outstanding radially disposed ears 68 and push-pull links 70 are provided, said links being pivotally or hingedly connected at their upper ends with said ears as at 72. The lower ends of the links 70 are pivotally attached to ears 74 on the shank portions of the grappling hooks 78. The hook portions are denoted at 80. The inner ends of the shank portions are pivotally mounted as at 82 between circumferentially spaced pairs of equidistant radial outstanding ears 84 on the marginal portions of the spider 86. Here again the spider is in the form of a disk-like plate and is in axial alignment with the float and has a central aperture 88. The spider is also provided with a pair of diametrically opposite lugs 90—90 to which the lower ends of the frame arms 64 are rigidly connected. The bait hook is denoted at 92 and has a flexible leader 94 passing upwardly through the hole 88 and joined to an ear 96 on the bottom of the float. The flexibly resilient longitudinally bowed finger or wire member is here denoted by the numeral 98 and it is anchored eccentrically or off center on the marginal portion of the spider as at 100. The aforementioned float 46 and leader 48 are connected with this finger 98 in the same manner already shown and described.

In the form of the invention shown in Figure 4 the operating connection between the fishing line comprises the soldered rod 58 and the inverted U-shaped frame 62 which is attached to the spider. This corresponds to the rod 28 and eye 30 in the form of the invention appearing in Figures 1 and 2.

In this form of the invention the float suspends the entire device in the water and the device is carried below the surface of the water by the weight or sinker. The pull down force of the weight separates the spider from the float and the links swing the grappling hooks to open position. When the bait on the bait hook is taken the float is pulled down toward the spider and the spider and float come together as shown in Figure 2 whereupon the linkage means serves to close the grappling hooks on the victim.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A fishing device of the class described comprising a float, a spider aligned with and movable toward and from one end of said float, a bait hook fastened to said float, means whereby a fishing line is operatively connected with said spider, a plurality of grappling hooks pivotally mounted on said spider, and links operatively joining said grappling hooks to said float.

2. The structure defined in claim 1 wherein said spider has a centrally disposed hole therein, said bait hook having a flexible leader, the latter passing through said hole and being fastened to a central axial portion of said float.

3. The structure defined in claim 1 wherein said spider has a centrally disposed hole therein, said bait hook having a flexible leader, the latter passing through said hole and being fastened to a central axial portion of said float, and a flexible resilient wire connecting said sinker off center to a marginal edge portion of said spider, whereby the sinker and bait hook do not, under ordinary circumstances, collide with each other.

4. A fishing device of the type described and shown comprising a float having circumferentially spaced radial outstanding ears, a spider in axial alignment with said float and movable toward and from said float, a plurality of circumferentially spaced grappling hooks having shank portions pivotally connected to the marginal edge portion of said spider, rigid push-pull links pivotally connected at corresponding ends to intermediate portions of the respective shank portions, the opposite ends of said links being pivotally connected with their respective ears on said float, a longitudinally bowed wire member secured at its upper and to an off center peripheral portion of said spider, a sinker having a flexible leader attached to the lower end of said wire member, said spider having a centered hole therein, a bait hook, and a flexible leader attached to the upper end of said bait hook passing upwardly through said hole, and secured to a central axial portion of said float.

5. The structure defined in claim 4, wherein said float has a passage axially therethrough, and a rigid rod reciprocable in said passage and secured rigidly at its lower end to a portion of said spider, the upper end of said rod having a line attaching eye.

6. The structure defined in claim 4, wherein said float has an axial passage, an inverted U-shaped frame having arms straddling diametrically opposite portions of said float and rigidly secured at their lower ends to said spider and also having a bight portion parallel with and spanning the upper end of said float, said bight portion being centrally apertured, and a rigid rod passing downwardly through said aperture, fixed to said bight portion and telescoping slidably into said passage, said rod having a fishing line eye at its upper end.

7. A fishing and crabbing device comprising a float of cylindrical cross-section having an axial passage extending through its upper and lower ends, a circular plate of a diameter corresponding to the diameter of float and constituting a spider, said plate being apertured, a rigid rod secured at its lower end to the central portion of the plate extending upwardly through and beyond the upper end of said passage and terminating in a line attaching eye and provided with a stop shoulder engageable with the upper end of the float, a bait hook having a flexible leader extending through the aperture in the spider, said leader being attached at its upper end to said float, a band encircling and fastened to said float and provided with outstanding pairs of circumferentially spaced equidistant ears, corresponding ears attached to the marginal portion of said spider, a plurality of circumferentially spaced grappling hooks having shank portions attached pivotally at their inner ends to the ears on said spider, push-pull links suitably connected at their upper ends to the ears on said band and pivotally connected at their lower ends to the ears on the shank portion, a longitudinally bowed wire member attached at its upper end off center to the marginal portion of said spider and depending from the spider and provided on its lower end with a sinker.

8. A fishing and crabbing device comprising a float, a spider in alignment with said float, a U-shaped frame having a bight portion and arms extending laterally therefrom, said arms straddling said float and having their lower ends attached to said spider, a rod attached intermediate its ends to said bight portion, said rod having a fishing line eye at its upper end and having its intermediate and lower end portion slidable in a passage provided therefor in said float, a bait hook, means securing said bait hook to said float, grappling hooks pivotally mounted on said spider and operating connections between the grappling hooks and float.

CLYDE W. BERRY.

References Cited in the file of this patent
UNITED STATES PATENTS

| Number | Name | Date |
| --- | --- | --- |
| 104,684 | Angle | June 28, 1870 |
| 1,189,637 | Schneller | July 4, 1916 |
| 1,239,487 | Hill | Sept. 11, 1917 |
| 1,763,921 | Buford | June 17, 1930 |